UNITED STATES PATENT OFFICE.

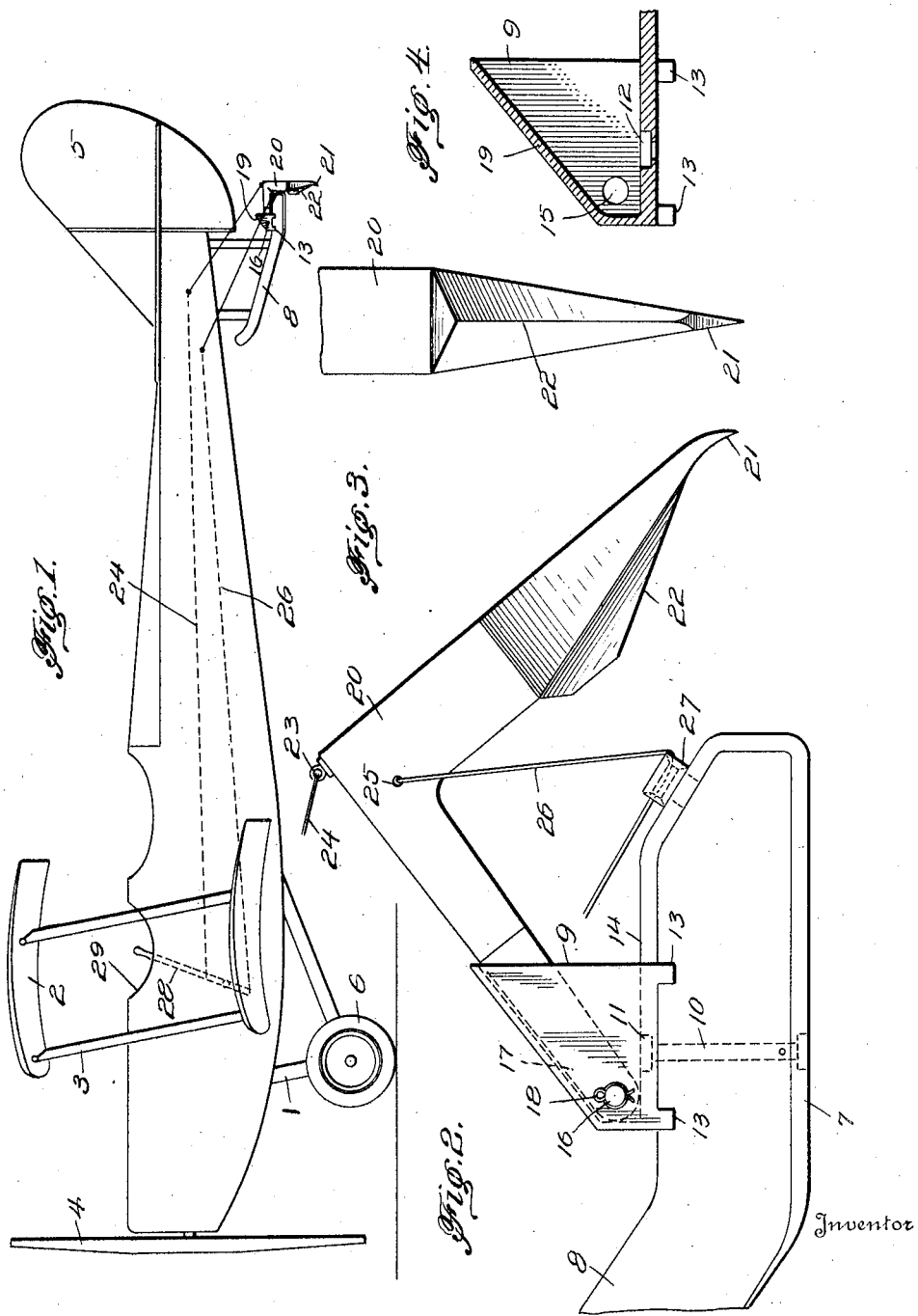

CARLO M. BAZZEGHIN, OF WASHINGTON, DISTRICT OF COLUMBIA.

AEROPLANE ATTACHMENT.

1,405,658.　　　　Specification of Letters Patent.　　Patented Feb. 7, 1922.

Application filed November 4, 1920. Serial No. 421,702.

*To all whom it may concern:*

Be it known that I, CARLO M. BAZZEGHIN, subject of the King of Italy, residing at Washington, in the District of Columbia, have invented certain new and useful Improvements in Aeroplane Attachments, of which the following is a specification.

This invention relates to an aeroplane attachment and more particularly to a brake mechanism for retarding the motion of an aeroplane after it has made a landing.

The primary object of the invention is the provision of a brake attachment to the tail skid of an aeroplane including operating mechanism within the cock pit of the aeroplane whereby the brake mechanism may be actuated to retard the motion of the aeroplane when it is gliding along the ground.

Another object of the invention is the construction of a brake mechanism attached to the angular extension of the tail skid, said mechanism comprising a sharpened and pointed extension adapted to engage the ground when the machine has made a landing and thereby retarding the forward motion of the machine and also prevent the possibility of its turning turtle.

With these objects in view and others which will be manifest and suggested as the nature and purpose of the invention are revealed in the following specification and drawing wherein I have shown a practical, yet preferred embodiment thereof.

Figure 1 is a perspective view showing the invention in use.

Fig. 2 is an enlarged view of the brake attached to the tail skid.

Fig. 3 is a front view of the ground engaging portion of the brake.

Fig. 4 is a detached sectional view of the housing for the brake.

Similar numerals in the specification referring to like and corresponding parts in the drawing, I have illustrated my invention as applied to a conventional type of aeroplane having the usual chassis 1, planes 2, interplane struts 3, propeller 4, vertical rudder 5, and ground wheels 6, all of which are of a well known construction.

To the angular extension 7 of the tail skid 8, I have provided a vertically secured housing 9 attached to the angular extension 7 by a securing bolt 10, the head portion 11 of said bolt being seated within the counter-sunk recess 12 of the housing. As clearly shown in Figs. 2 and 4, it will be seen that the housing is provided with short downward extensions 13 on each side of the upper portion 14 of the tail skid, thus preventing lateral movement of said housing for the purpose which will presently appear.

The housing 9 is provided with a transverse aperture 15 which receives the connecting pin 16 pivotally securing the forward portion 17 of the brake now to be described. The staple 18 retains the pin 16 in position within the housing which as shown has an angular extending top 19 which forms a stop to limit the vertical movement of the said brake. The brake proper comprises a right angular extension 20 positioned and arranged rearwardly and downwardly of the angular extension of the tail skid, the said downward portion of the brake 20 being provided with a curved sharpened extremity 21 and a beveled front cutting edge 22 adapted to grip and cut the ground thus retarding the forward motion of the aeroplane and permits the same to be stopped within a comparatively short distance. An eye 23 attached to the brake 20 forms a securing means for the rear extremity of a flexible element 24, the said brake 20 being also provided with an aperture 25 which receives the extremity of another flexible element 26 passing through a guide 27, said flexible elements being connected to a throw lever 28 within the cock pit 29 of the aeroplane. It will thus be seen that as the throw lever is actuated over a rack (not shown) in the cock pit the flexible elements may raise or lower the brake 20 and thus it will be apparent that as the said brake engages and drags along the ground the aeroplane may be brought to a stop within a comparatively very short distance. The brake operating mechanism is, of course, positioned and arranged within convenient reach of the operator so that it may be actuated as desired, it being readily seen that the ground extension 21 and the cutting edge 22 may just scrape along or dig deeply into the ground thus retarding the aeroplane as the operator may desire.

In the accompanying drawing, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. In an attachment to the tail skid of an aeroplane, an open housing secured to said tail skid, a ground engaging brake pivoted to said housing and limited in its vertical movement thereby and means for operating said brake.

2. In an attachment to the tail skid of an aeroplane, an open housing having an inclined top wall carried by said tail skid, a ground engaging brake pivoted within the housing, and limited in its vertical movement by said top wall and means for operating said brake.

3. In an attachment of the tail skid of an aeroplane, a housing having an inclined top wall and open at its rear secured to the tail skid, a ground engaging brake pivotally mounted within the lower portion of said housing and limited in its vertical movement by the top wall thereof, said brake extending rearwardly and downwardly of said skid, flexible elements connected to said brake, and means for actuating said flexible elements to raise and lower the brake.

4. In an attachment to the tail skid of an aeroplane, a housing having an inclined top wall and open at its rear secured to the tail skid, a right angular ground engaging brake pivotally mounted within the forward portion of said housing and limited in its vertical movement thereby, an operating lever in the cock pit of the aeroplane and flexible elements connecting said lever and brake for raising and lowering the same to operative and inoperative positions.

In testimony whereof, I affix my signature hereto.

CARLO M. BAZZEGHIN.